UNITED STATES PATENT OFFICE.

WILHELM NEELMEIER, OF LEVERKUSEN, NEAR COLOGNE, GERMANY, ASSIGNOR TO FARBENFABRIKEN VORM. FRIEDR. BAYER & CO., OF ELBERFELD, GERMANY, A CORPORATION OF GERMANY.

AMINOBENZOYLAMINOBENZOYL-2-AMINO-5-NAPHTHOL-7-SULFONIC ACID.

13,304. Specification of Reissued Letters Patent. Reissued Oct. 31, 1911.

No Drawing. Original No. 994,420, dated June 6, 1911, Serial No. 610,505. Application for reissue filed September 1, 1911. Serial No. 647,291.

*To all whom it may concern:*

Be it known that I, WILHELM NEELMEIER, doctor of philosophy, chemist, citizen of the German Empire, residing at Leverkusen, near Cologne, Germany, have invented new and useful Improvements in Aminobenzoylaminobenzoyl-2-Amino-5-Naphthol-7-Sulfonic Acids, of which the following is a specification.

My invention relates to the manufacture and production of compounds valuable for the production of dyestuffs which can be obtained by condensing nitrobenzoylhalogenids, such as ortho-, para- or meta-nitrobenzoyl-chlorid with ortho-, meta- or para-aminobenzoyl-2-amino-5-naphthol-7-sulfonic acid and by reducing the condensation products thus obtained. These new products of the formula:

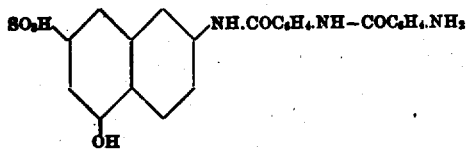

are distinguished by the remarkable property, that they have the same affinity for the fiber, as the so-called substantive dyes and that they can be fixed on the fiber in the same way as these colors. Cotton thus prepared can be combined with diazocompounds, or can be diazotized and combined with azo-dyestuff components.

The new products are after being dried and pulverized in the shape of their alkalin salts whitish powders soluble in water, upon treatment with hot caustic alkali they are split up into one molecule of 2-amino-5-naphthol-7-sulfonic acid and into two molecules of amino-benzene carboxylic acid.

In order to illustrate the new process more fully the following example is given, the parts being by weight:—A neutral solution prepared by dissolving 35.8 parts of meta-aminobenzoyl-2-amino-5-naphthol-7-sulfonic acid in 500 parts of water containing 5.3 parts of sodium carbonate is heated to 50–60° C.; 14 parts of crystallized sodium acetate are added to it and then 18.6 parts of molten meta-nitrobenzoyl chlorid. The mixture is stirred at a temperature of about 50–60° C. for 2 hours, the condensation product is filtered off and is then introduced into a boiling mixture of 20 parts of iron filings, 500 parts of water and 1 part of acetic acid (80 per cent). After about one hour the reduction is complete. The iron is after precipitation with sodium carbonate removed by filtration and the sodium salt of the new acid separates from the filtrate after the addition of so much hydrochloric acid that the liquid is neutral to litmus. On addition of an excess of acid the free acid having the formula:

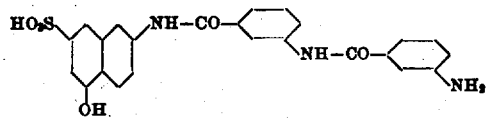

separates.

I claim:—

The herein described aminobenzoylaminobenzoyl-2-amino-5-naphthol-7-sulfonic acids of the formula:

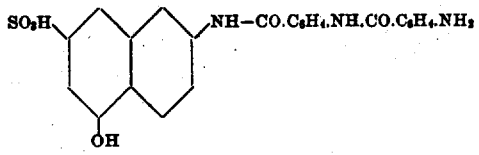

which are after being dried and pulverized in the shape of their alkalin salts whitish powders which are soluble in water; the new compounds can be fixed on the fiber and combined with diazocompounds valuable shades being obtained; and are split up upon treatment with hot caustic soda into 2-amino-5-naphthol-7-sulfonic acid and aminobenzene carboxylic acid, substantially as described.

In testimony whereof I have hereunto set my hand in the presence of two subscribing witnesses.

WILHELM NEELMEIER. [L. S.]

Witnesses:
CHAS. J. WRIGHT,
L. NUFER.